(12) United States Patent
Friedland et al.

(10) Patent No.: US 6,429,423 B1
(45) Date of Patent: Aug. 6, 2002

(54) OPTICAL SCANNER

(75) Inventors: Igor Friedland, Holon; Mark Shechterman, Nes Ziona, both of (IL)

(73) Assignee: ELOP Electro-Optics Industries Ltd., Rehovot (IL)

( * ) Notice: Subject to any disclaimer, the term of this patent is extended or adjusted under 35 U.S.C. 154(b) by 0 days.

(21) Appl. No.: 09/551,955

(22) Filed: Apr. 19, 2000

(30) Foreign Application Priority Data

May 3, 1999 (IL) ................................. 129738
Jul. 15, 1999 (IL) ................................. 130976

(51) Int. Cl.$^7$ ................ H01J 3/14; H01J 5/16; H01J 40/14
(52) U.S. Cl. .................... 250/234; 250/208.1; 250/235; 250/236
(58) Field of Search .................. 250/234, 208.1, 250/235, 236; 359/197, 201, 202, 204, 212, 217, 220, 872, 873, 874, 876

(56) References Cited

U.S. PATENT DOCUMENTS 5,334,830 A * 8/1994 Fukuyama et al. ......... 250/216
5,844,673 A * 12/1998 Ivers ........................... 356/138

* cited by examiner

Primary Examiner—Robert H. Kim
Assistant Examiner—Courtney Thomas
(74) Attorney, Agent, or Firm—Connolly Bove Lodge & Hutz, LLP; Larry J. Hume (57) ABSTRACT

The invention provides a device for linear scanning, including at least one reflecting element whereby an incident beam of light undergoes at least two reflections; at least one optical system comprising an objective capable of forming an image of an object, the objective, depending on the respective direction of the light beam, defining a pre-objective scanning space and a post-objective scanning space; a mounting structure for the at least one reflecting element; drive means for causing the mounting structure to perform a movement; and a light-detecting element for detecting the incident beam of light, or an element for producing light, wherein, with light-detecting, scanning takes place in the post-objective space, and with light-producing, scanning takes place in the pre-objective space.

27 Claims, 8 Drawing Sheets

OPTICAL SCANNER

FIELD OF THE INVENTION

The present invention relates to an optical scanning device; more particularly, to a device in which scanning is effected by the reciprocating linear or continuous rotary movement of a ray-deflecting element.

BACKGROUND OF THE INVENTION

Optical scanning is well-known and has many civilian, as well as military, uses. Present optical scanners are galvanometer-based devices in which an image produced by an optical system is moved across an image plane in the form of a photodetector. This scanning movement is produced by a beam-deflecting element such as a mirror, which is angularly oscillated about an axis perpendicular to the optical axis by a galvanometer-type drive (e.g., moving-coil, moving-iron, moving-magnet drive).

These scanners, also known as galvo-based scanners, suffer from several inherent drawbacks, the most serious one of which is due to the substantial beam excursion across the system aperture, owing to the fact that the oscillating mirror usually constitutes a pupil of the optical scanning system. This produces serious optical aberrations such as coma, distortion and field curvature. To compensate for these aberrations, a special optical system, such as an F–θ lens and/or a flattening lens, and electronic means such as non-linear scanning, are required. An F–θ lens satisfies the condition y'=f×θ; that is, the image height equals the product of the focal length of the objective and the scanning angle. Such objectives exist and are known as F-Theta objectives. A flattening lens is usually located close to the scanned plane and corrects field curvature relative to the required flat field. These optical systems are of great complexity, comprising several aspherical surfaces, provide at best no more than average resolution, and make the scanners very expensive devices.

A second disadvantage of the known galvo-based scanners is the relatively large mass and, consequently, large inertia of the oscillating system, which, especially with wide beams, strictly limits the scanning frequency.

SUMMARY OF THE INVENTION

It is thus one of the objects of the present invention to provide an optical scanner which uses a scanning system in which the scanning movement of the beam-deflecting element is linearly reciprocating or continuously rotating, and is thus free of the optical aberrations inherent in the prior art scanners, permitting the use of relatively simple, low-cost optical systems.

It is another object of the invention to provide a optical scanner in which the scanning action takes place in close proximity to the image plane or intermediate image plane, or, in case of a reversed configuration, the plane of the object in the form of a light source.

It is a further object of the invention to provide, in the galvanometer-based configuration, a scanner that has a relatively low inertial mass, permitting scanning at relatively high frequencies and, in the continuously rotating configuration, a scanner that is capable of a relatively high duty cycle.

According to the present invention, the above objects are achieved by providing a device for optical scanning, comprising at least one reflecting element whereby an incident beam of light undergoes at least two reflections; at least one optical system comprising an objective capable of forming an image of an object, said objective, depending on the respective direction of said light beam, defining a pre-objective scanning space and a post-objective scanning space; a mounting structure for said at least one reflecting element; drive means for causing said mounting structure to perform a movement; a light-detecting element for detecting said incident beam of light, or an element for producing light, wherein, with light-detecting, scanning takes place in said post-objective space, and with light-producing, scanning takes place in said pre-objective space.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
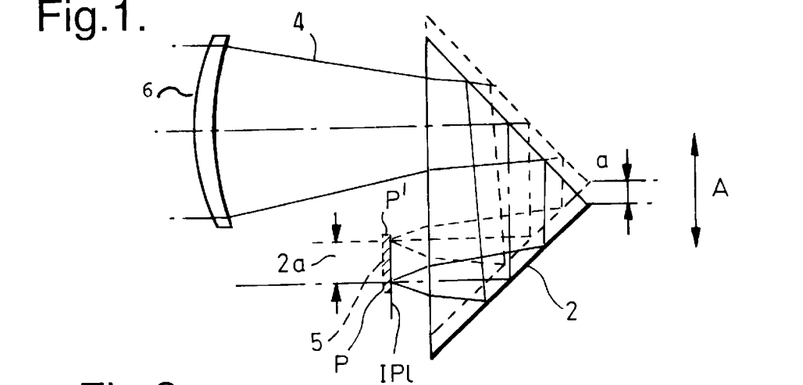
FIG. 1 schematically illustrates the principal component of the linearly reciprocating or oscillating scanner according to the present invention in its two extreme positions, including the respective paths of a bundle of converging rays.

Referring now to the drawings, there is seen in FIG. 1 a right-angle optical element such as a prism 2, also known as a Porro prism, which is one of the principal components of the scanner according to the invention. With the aid of drive means to be described further below, prism 2 is oscillated in the direction of double arrow A between a first position indicated by solid lines, and a second position indicated by dashed lines. A bundle of light rays 4, converged by means of an objective 6, is seen to be reflected (and refracted) twice, producing an image point P outside of prism 2 and defining an image plane IPl. It is also seen that a translational displacement of prism 2 by a distance a produces a shift of image point P to point P' by a distance of 2a.

Further seen in FIG. 1 is a photodetector 5 located in image plane IPl and impacted by the scanning image, with the image being scanned by photodetector 5. As in principle the direction of light rays in optical devices is reversible, detector 5 can be replaced by a light source, to "paint" an object in the object space. The reversed configuration can be used for different purposes, such as cutting, drilling, illuminating, etc., by different optical sources, including laser beams.

It is obvious that prism 2 could be replaced by a pair of mirrors which include between them an angle equal to the vertex angle of the Porro prism. While the reflecting effect is identical to that of the prism, there is no refraction, eliminating absorption losses which, in the UV and IR regions, might be objectionable. Such pairs of mirrors can be seen in FIGS. 3 and 4.

FIG. 1 is a schematic representation, meant to explain the working principle of the scanner. In practice, an efficient optical system for the scanner also requires a field lens that reduces the required objective diameter for a given entrance pupil diameter, while ensuring telecentric principal rays in the space close to the image plane.

Figure 2:
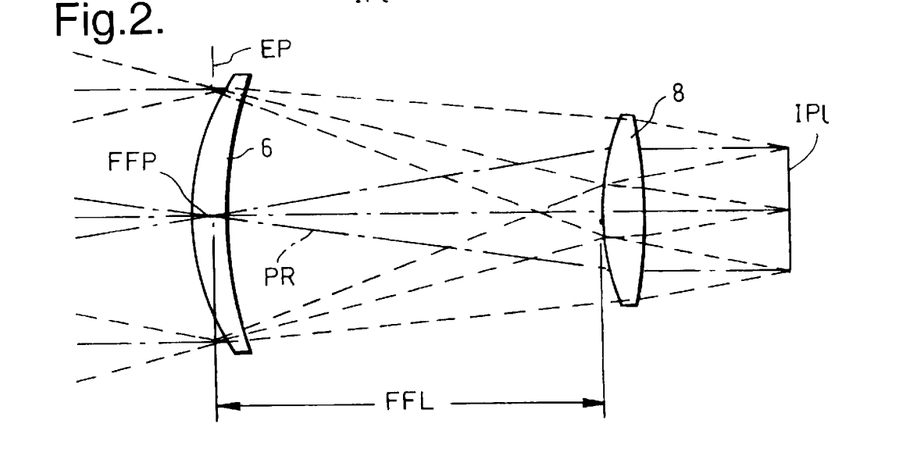
FIG. 2 shows the basic optics of the scanner of FIG. 1.

FIG. 2 shows the optical system which, apart from the objective lens 6, also includes a field lens 8 and the entrance pupil EP. For the principal rays PR in the image space to be telecentric, i.e., normal to the image plane IPl, the front focal point FFP of field lens 8 must be located in the plane of entrance pupil EP. Accordingly, field lens 8 must be located at a distance from entrance pupil EP equal to its front focal length FFL.

Figure 3:
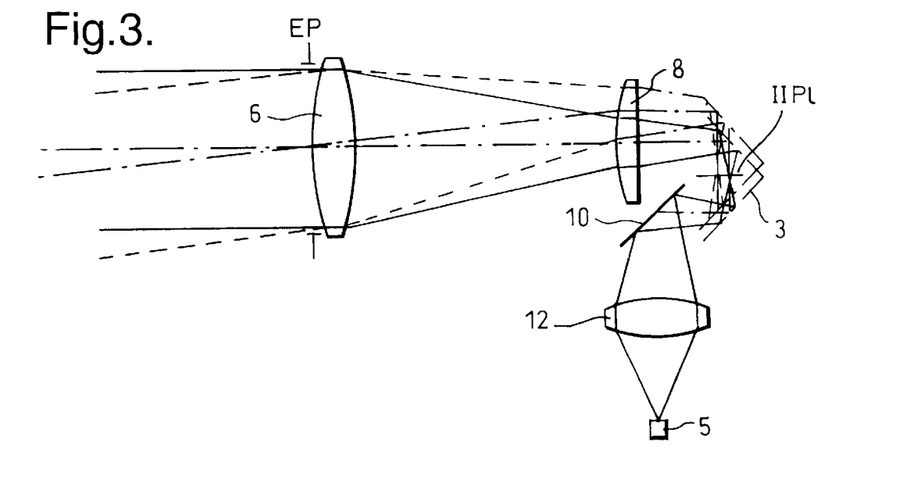
FIG. 3 is an elaboration of the arrangements of FIGS. 1 and 2, including the use of an intermediate image plane.

FIG. 3 illustrates the use of an intermediate image which is produced inside mirror pair 3. This arrangement presents several advantages, inasmuch as the size of the scanning element is not a function of the aperture of the optical system. It is thus possible to use large-aperture systems having high spatial resolution with the same small scanning element, as wide-angle systems with a small aperture and low spatial resolution. Also, the numerical aperture (NA) at the intermediate image can differ from the NA at the image itself. Thus, high linear resolution can be achieved by designing the optical system with a low NA in the scanner space and a high NA in the image space.

Seen in FIG. 3 are objective 6, field lens 8, a light-reflecting or scanning element, in this case the above-mentioned pair of mirrors 3, intermediate image plane IIPl, folding mirror 10, relay optics 12 and detector 5 (or, with beam reversal, a light source). While in FIG. 3 the object is at infinity and the incident rays are therefore parallel, the same arrangement with appropriate adjustments can also be used for objects at finite distances.

Figure 4:
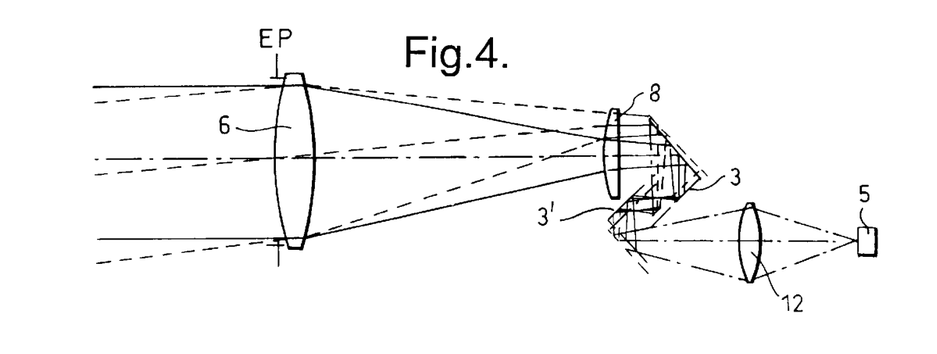
FIG. 4 illustrates the use of two simultaneously oscillating scanning elements.

A further elaboration is illustrated in FIG. 4, in which the folding mirror of FIG. 3 is replaced by a second pair of scanning mirrors 3'. Both mirror pairs 3, 3' oscillate simultaneously, but in opposed phases. With this arrangement, image displacement is double that of the arrangement depicted in FIGS. 1 and 3. In other words, if in the latter designs a mirror pair displacement by a distance a produces a shift of an image point by a distance of 2a, the arrangement illustrated in FIG. 4 will produce an image shift by a distance of 4a.

Figure 5:
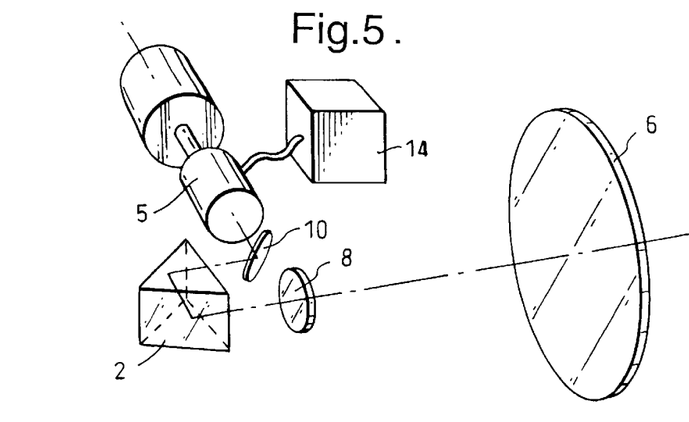
FIG. 5 shows the general layout of the optical and electronic components of the linear scanner according to the invention.
Figure 6:
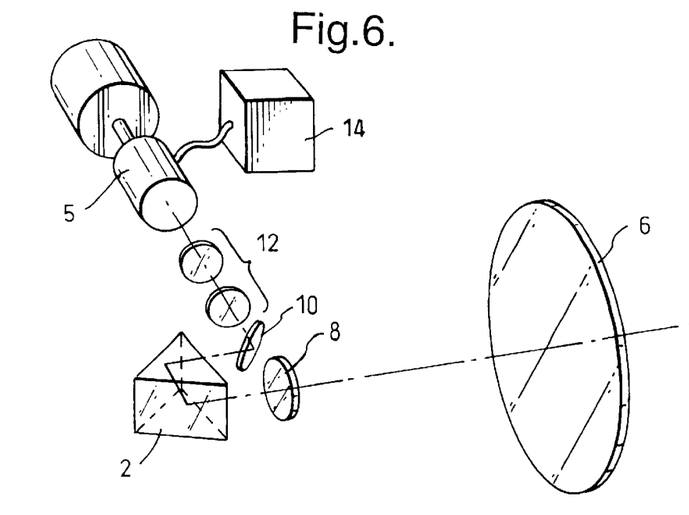
FIG. 6 is a similar layout, but also including relay optics.

FIGS. 5 and 6 represent the general layout of the optical and electronic components of the linear scanner according to the present invention. There are seen objective 6, field lens 8, scanning prism 2, folding mirror 10, photodetector 5 and electronic processor 14. The two latter components are per se known and are also used in prior art galvanometer-based scanners. In addition to the above-listed components, FIG. 6 also shows relay optics 12, which facilitate the use of a smaller scanning prism 2 and provide the necessary physical space.

Figure 7:
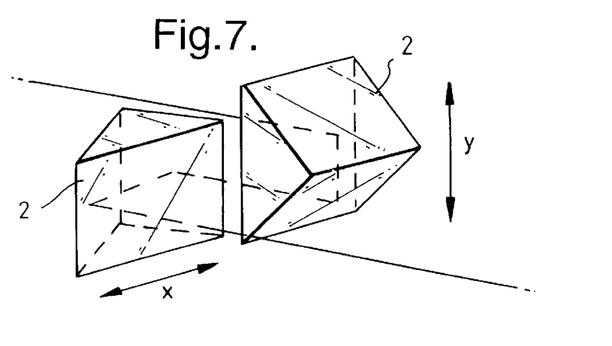
FIG. 7 shows a two-prism arrangement suitable for two-dimensional scanning.

While the scanning schemes shown so far are suitable for one-dimensional scanning, the linear scanning principle is also applicable to two-dimensional scanning. The required two-prism arrangement is shown in FIG. 7. Clearly, the oscillations of the two prisms must be rigidly coordinated.

Figure 8:
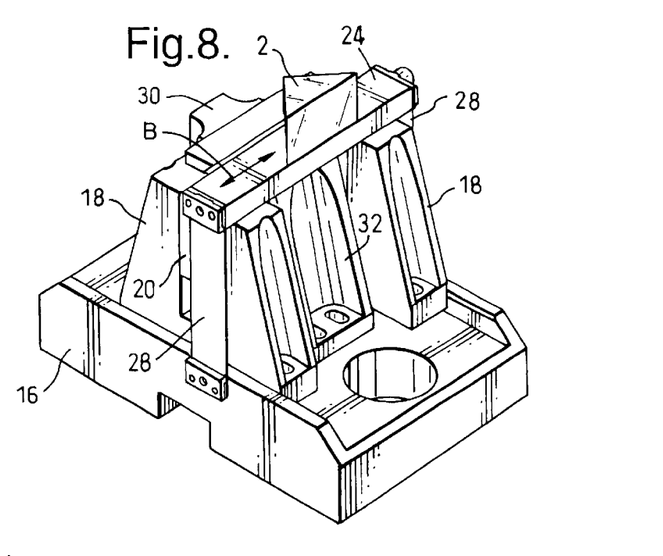
FIG. 8 is a perspective view of some of the electromechanical components of the linear scanner according to the present invention.

FIG. 8 illustrates some of the electromechanical components of a preferred embodiment of the linear scanner according to the present invention. There is seen a carrying member or base 16 on which are rigidly mounted two ferromagnetic armatures 18, shown to better advantage in FIG. 9. Each of armatures 18 carries two permanent magnets 20 that produce a strong, substantially homogeneous magnetic field across a gap 22. Each magnet is of a length $L_m$.

Figure 10:
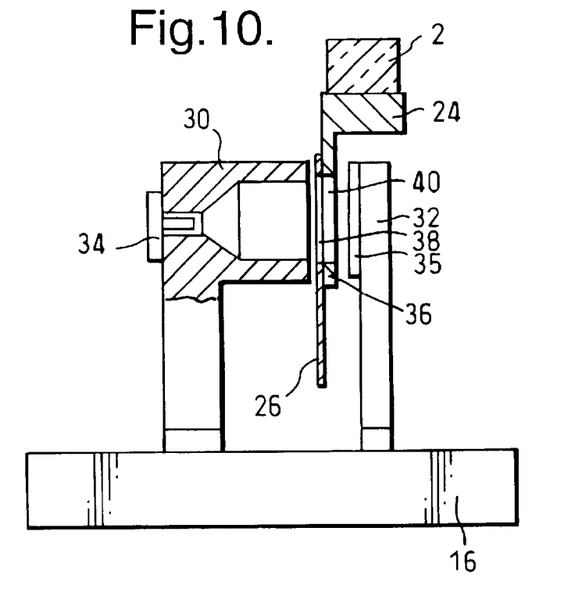
FIG. 10 is a simplified side view, in partial cross-section, of the arrangement shown in FIG. 8.
Figure 11:
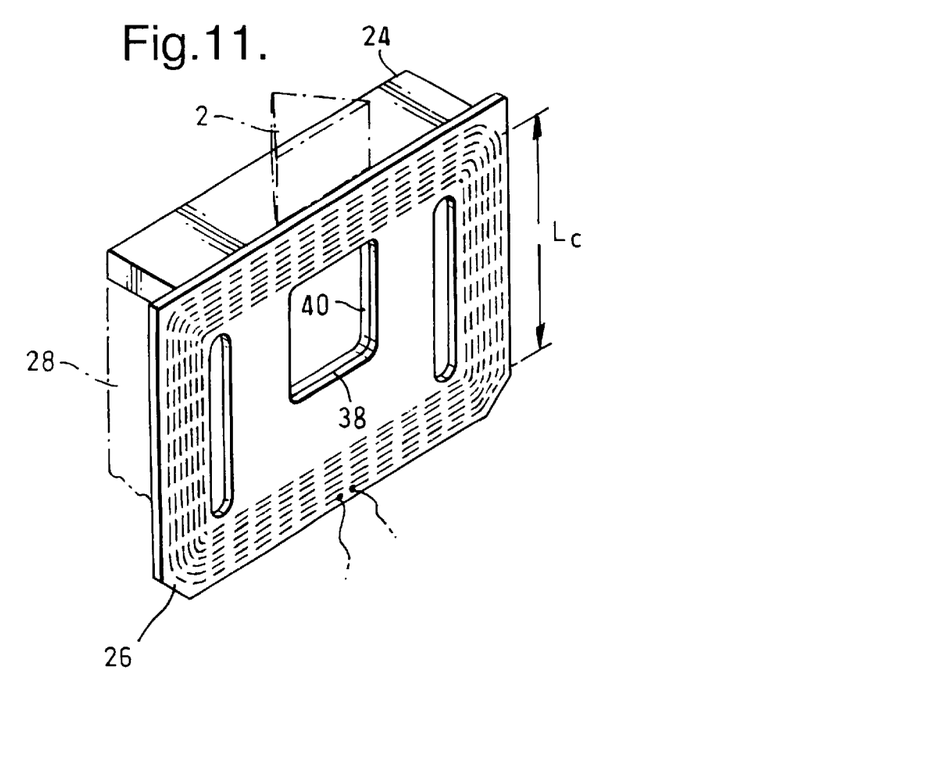
FIG. 11 is a perspective view of the printed circuit board in which a coil is embedded.

Further seen is a bridge 24, seen to better effect in cross-section in FIG. 10, which carries scanner prism 2, as well as a printed circuit board (PCB) 26, seen in greater detail in FIG. 11. Bridge 24, as clearly seen in FIG. 10, is located above armatures 18 and is kinematically connected to base 16 by means of flat springs 28, which provide bridge 24 with one degree of freedom in translation in the direction of double arrow B. Strictly speaking, because of the finite length of springs 28, the reciprocating or oscillatory movement of bridge 24, and thus of prism 2, is not perfectly rectilinear, but, as will be shown further below, care is taken to prevent this minute deviation from affecting the Lorentz force acting on the conductors of the moving coil of this galvanometer-based embodiment.

Figure 9:
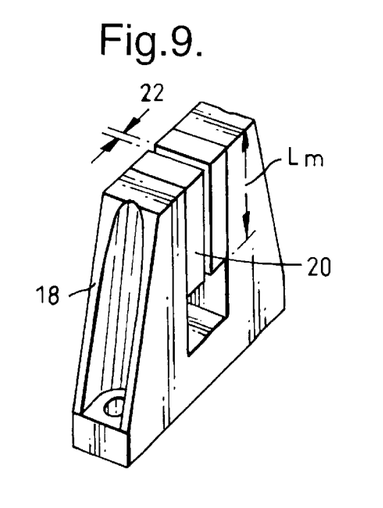
FIG. 9 is a perspective view of the ferromagnetic armature and the permanent magnets.

Also seen in FIGS. 8 and 9 are two uprights 30, 32. Upright 30 serves as a mount for an LED-type light source 34 (FIG. 10) and upright 32 carries a bi-cell photodetector 35. The purpose of these two components will become apparent further below.

FIG. 11 shows a printed circuit board (PCB) 26, which actually constitutes the "moving coil" of the linear scanner. It incorporates N current-carrying conductors in each of n superposed layers. Each conductor has an active length of $L_c$ located in the magnetic field generated by magnets 20 (FIG. 9). The Lorentz force acting on the conductors, i.e., on the PCB, is $$F=2L_cBINn$$

wherein

I=coil current, and

B=magnetic flux density.

When the unit shown in FIG. 11 oscillates, the original rectangle constituted by base 16, bridge 24 and flat springs 28 periodically turns into a parallelogram, the height of which is less than that of the original rectangle by the amount of ΔY. To prevent this deviation from affecting the Lorentz force, the following conditions must obtain:

$$L_c=L_m+\Delta Y,$$

or $$L_c \leq L_m+\Delta Y$$

wherein:

$L_c$=active length of the conductors (FIG. 11), and $L_m$=length of magnets (FIG. 9).

PCB 26 is firmly attached to a vertical extension 36 of bridge 24 (FIG. 10) and is provided with a window-like opening 38 which registers with a similar opening 40 in extension 36.

The purpose of the above-mentioned LED 34 and bi-cell photodetector 35 is to utilize the oscillating members of the linear scanner also as a sensor, facilitating the determination of the instantaneous position of scanning prism 2. This will now be explained in conjunction with FIG. 12, in which are seen PCB 26, window 38 and photodetector 35. The latter is subdivided into two cells 42, 44, each of which, upon being illuminated by LED 34, produces an independent output. As photodetector 35 is stationary, being attached to upright 32 while window 38, being part of PCB 26, oscillates in the direction of double arrow A, it is clear that, during one-half of an oscillation, window 38 will obturate more and more of one cell, say cell 42, while exposing more and more of the other cell 44. The respective outputs of cells 42, 44 are led via preamplifiers 46, 48 respectively, and are compared with the aid of differential amplifier 50, the output signal of which defines the instantaneous position of scanning prism 2 relative to the stationary border line between cells 42 and 44. Sum amplifier 52, amplifier 54, low-pass filter or integrator 56, LED driver 58 and voltage reference 60 are used to stabilize the mean light output of LED 34.

The outputs of cells 42, 44 can also be used in an open loop mode, for display purposes only.

Figure 12:
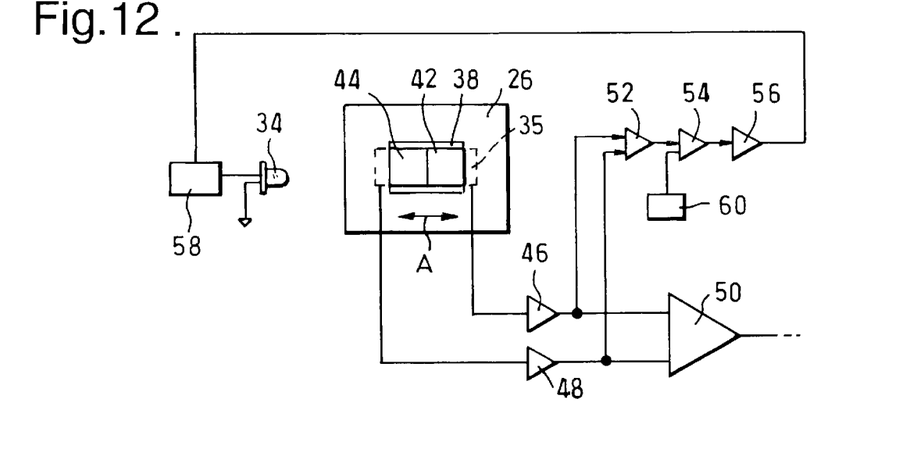
FIG. 12 is a circuit diagram of the position sensor.

In the "moving magnet" embodiment, too, the relative height-wise positions of photodetector 35 and window 38 change during oscillation by a maximum value of ΔY, and the relative magnitudes of detector and window height can be determined in an analogous manner so as not to affect the position signal.

Figure 13:
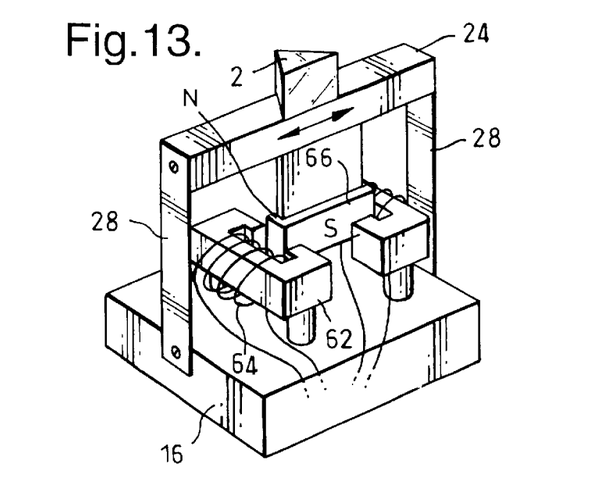
FIG. 13 is a schematic, perspective view of the linear scanner based on the "moving magnet", principle.

Another embodiment of the linear scanner according to the present invention utilizes the "moving magnet" principle, and is seen in FIG. 13. Prism 2 is mounted on bridge 24, which is supported by flat springs 28 attached to base 16. Further seen are two substantially C-shaped ferromagnetic electromagnet cores 62, each provided with a winding 64 and fixedly mounted on base 16.

Rigidly suspended from bridge 24 is a magnet 66, the poles N, S of which face the pole pieces of cores 62. The working of this scanner is self-understood: depending on the polarity of magnetization of cores 62, magnet 66 is either drawn into, or repelled from, the respective core gap.

Linear scanners can also be based on the "moving iron" principle and position sensors can also work on capacitance arrangements, such as "moving-plate" or "moving dielectric" sensors.

Figure 14:
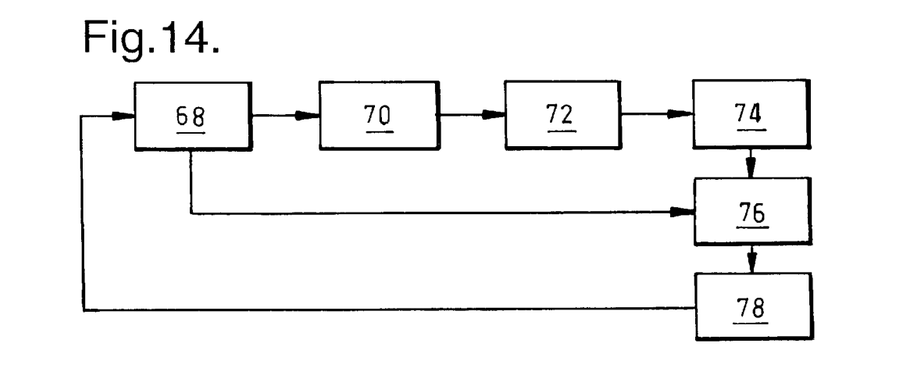
FIG. 14 is a block diagram explaining how linear scanners can be driven at resonance.

FIG. 14 is a block diagram showing how the linear scanner of FIG. 8 can be driven at resonance. A sinusoidal voltage of the voltage-controlled oscillator 68 of the correct frequency and amplitude is applied through driver 70 to linear scanner 72 to set it resonating. The phases of the signals of position sensor 74 and voltage-controlled oscillator 68 are compared with the help of phase detector 76. The output signal of the latter is filtered and amplified (block 78) and applied to oscillator 68 to minimize phase error.

Figure 15:
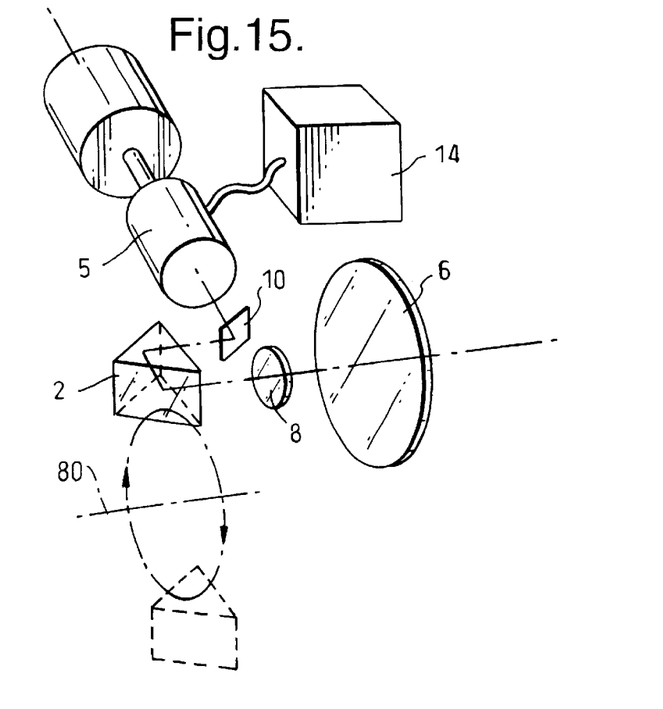
FIG. 15 shows the general layout of the optical and electronic components of a first embodiment of the rotary scanner according to the invention.

A first embodiment of the device in which the scanning movement is a continuously rotating one is represented in FIG. 15. There are seen objective 6, field lens 8, prism 2, folding mirror 10, photodetector 5 and electronic processor 14. The difference between this embodiment and the embodiment of FIG. 5 resides in the fact that prism 2 is mounted on a base (not shown) which performs a rotary movement about an axis 80 that is parallel to the optical axis; in other words, prism 2 (of which there can be more than one), rotates in a plane perpendicular to that axis. The prism shown in dashed lines indicates the position of prism 2 after a rotary movement of 180°.

Figure 16:
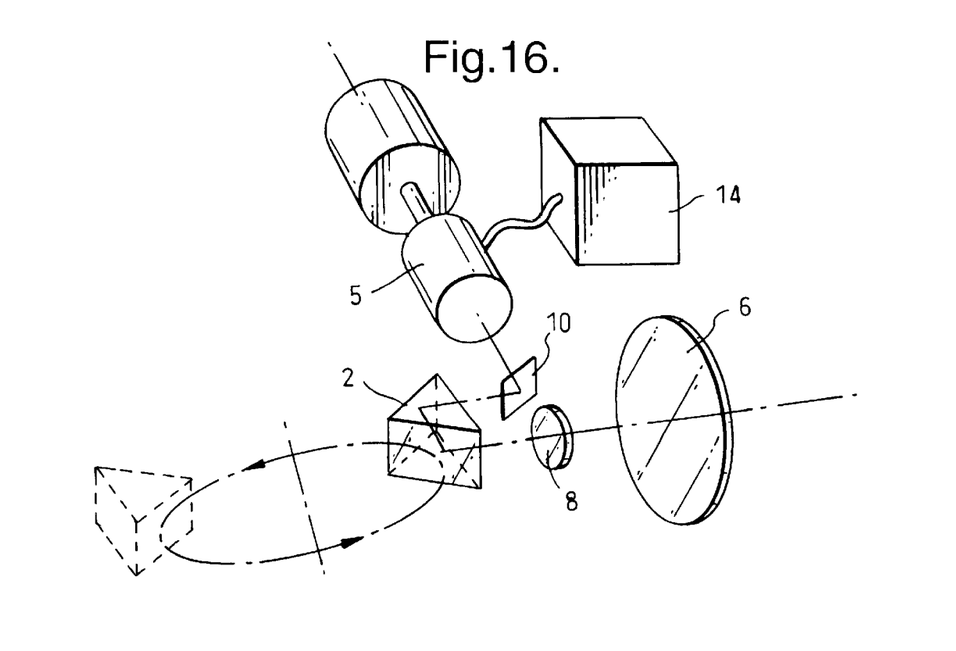
FIG. 16 is a similar layout of a second embodiment of the rotary scanner.

FIG. 16 represents a similar rotary arrangement, except that the scanning element rotates about an arbitrary axis. In this case, the optical system may have to be modified to compensate for focus errors and distortion introduced by the scanner.

Figure 17:
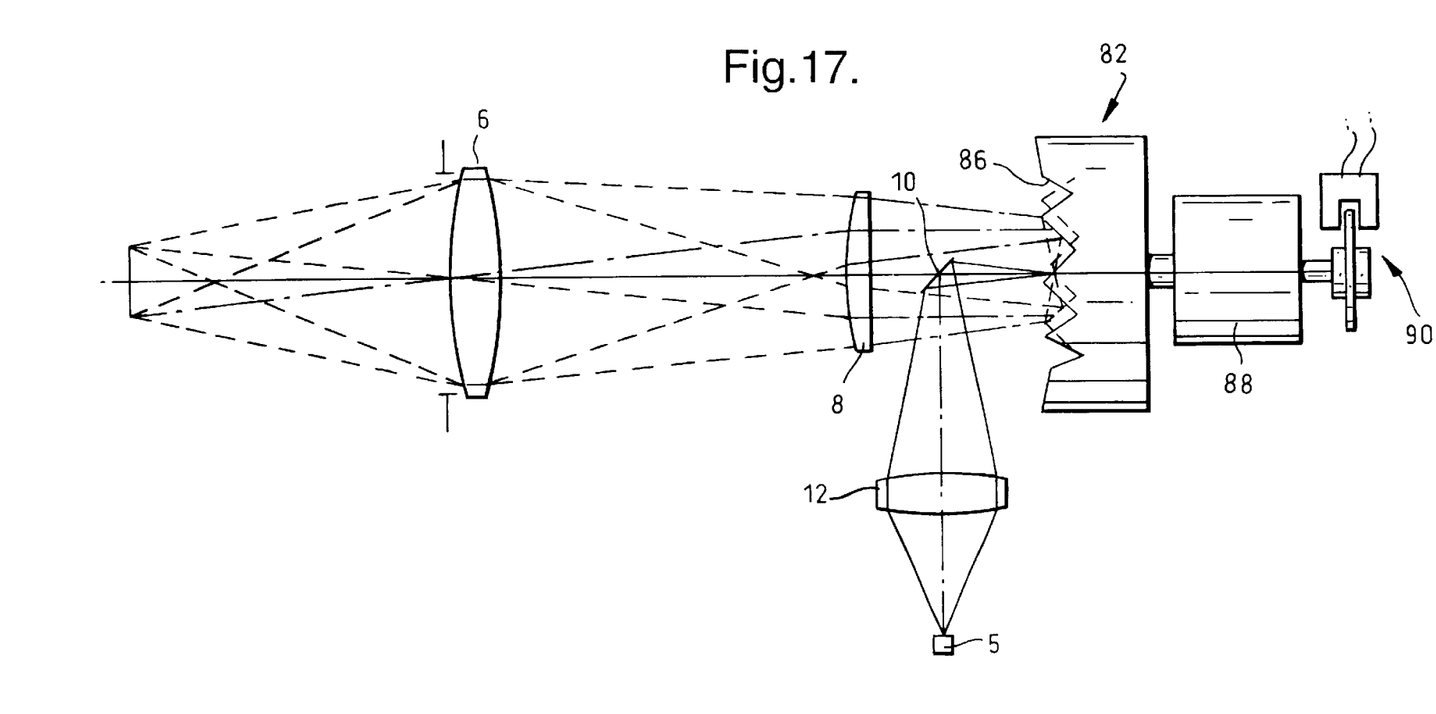
FIG. 17 is a schematic representation of a multi-reflector rotary scanner according to the invention, including relay optics and a rotary encoder.

Rotational scanning using a plurality of scanning elements is represented in FIG. 17. Shown are objective lens 6, field lens 8, folding mirror 10, relay objective 12 and photodetector 5. Multi-reflector scanning element 82, seen to better effect in FIGS. 18 and 19, consists of a disk 84, with which is integral, or to which is cemented, an annular structure comprising pairs of reflecting surfaces 86, including with one another an angle α=90°. Scanning disk 84 is mounted on the shaft of an electric motor 88 (FIG. 17), to which is also coupled a rotary encoder 90. The latter is the functional analogue of LED 34 and bi-cell photodetector 35 of the previously discussed linearly oscillating embodiment of the invention (FIG. 10), in this case facilitating the determination of the instantaneous position of rotary scanning element 82.

Seen in FIG. 17 is the scanning element 82 and its reflecting surfaces 86 at the initial and terminal positions (solid and dashed lines, respectively) of a scanning cycle. The fact that the intermediate image is produced in close proximity to reflecting surfaces 86 permits a duty cycle of close to 100%.

Figure 18:
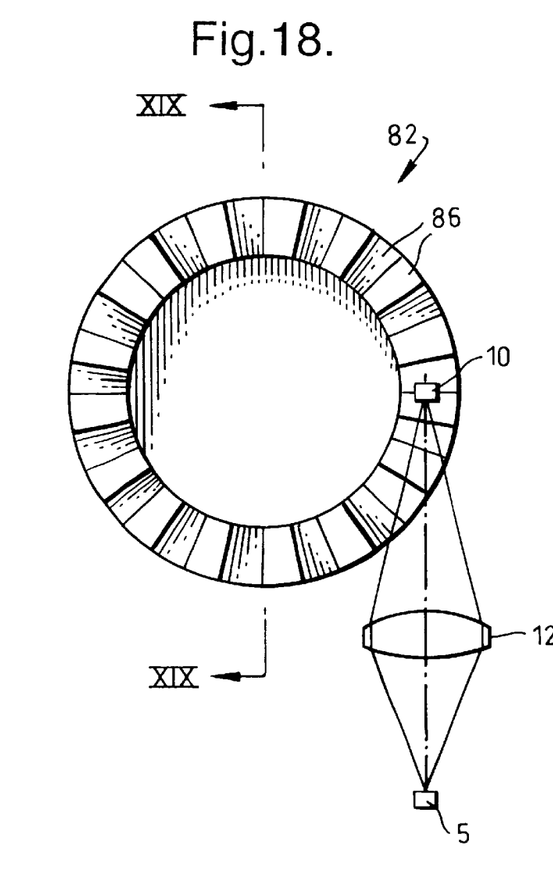
FIG. 18 is a front view of the reflecting element of the embodiment of FIG. 17 as seen in the direction of arrow A in FIG. 17.
Figure 19:
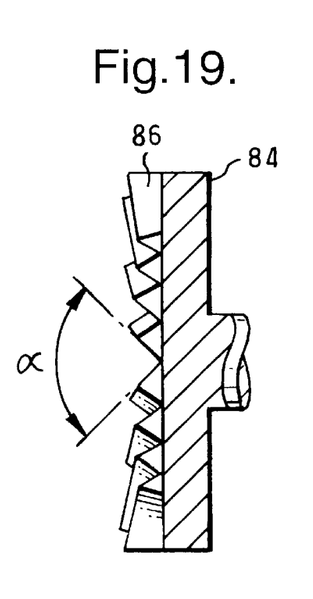
FIG. 19 is a view in cross-section along plane XIX—XIX of FIG. 18.

FIG. 18 also clearly shows that the optical axis of the scanner, which is co-planar with the axis of the relay optics 12, is laterally offset with respect to the axis of rotation of scanning element 82.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for linear scanning, comprising:
 a reflecting element selected from the group consisting of a prism and a pair of angle mirrors arranged and adapted so that an incident beam of light undergoes at least two reflections;

at least one optical system comprising an objective which forms an image of an object, said objective, depending on the respective direction of said light beam, defining a pre-objective scanning space and a post-objective scanning space;

a mounting structure for said at least one reflecting element;

drive means for moving said mounting structure in one of a linearly reciprocating motion and a continuously rotating motion; and a light-detecting element for detecting said incident beam of light, wherein, with light-detecting, scanning takes place in said post-objective space.

2. The device as claimed in claim 1, wherein said movement is a linearly reciprocating movement.

3. The device as claimed in claim 1, wherein said movement is a continuously rotating movement.

4. The device as claimed in claim 1, wherein said light-reflecting element is at least one right angle prism.

5. The device as claimed in claim 1, wherein said light-reflecting element is at least one pair of mirrors including between them an angle less than 180°.

6. The device as claimed in claim 3, wherein said light-reflecting element is comprised of a plurality of pairs of mirrors arranged in an annular configuration.

7. The device as claimed in claim 2, wherein said drive means is a moving-coil galvanometric drive.

8. The device as claimed in claim 7, wherein the coil of said moving-coil drive means is an integral part of a printed circuit board.

9. The device as claimed in claim 3, wherein said drive means is an electric motor causing said mounting structure to rotate.

10. The device as claimed in claim 2, wherein said movement is opposed by the restoring force of at least one elastically resilient member.

11. The device as claimed in claim 1, wherein said optical system produces at least one intermediate image, with scanning being performed at the location of said intermediate image and relay optics transmitting said image to said light-detecting element.

12. The device as claimed in claim 1, further comprising a position sensor.

13. The device as claimed in claim 12, wherein said position sensor includes a light source and a bi-cell photodetector stationary relative to a carrying member, wherein a differential output of the two cells of said bi-cell photodetector vary as a function of an instantaneous position of said reflecting element.

14. The device as claimed in claim 12, wherein said position sensor is a rotary encoder coupled to an electric motor.

15. A device for linear scanning, comprising:

a reflecting element selected from the group consisting of a prism and a pair of angle mirrors arranged and adapted so that an incident beam of light undergoes at least two reflections;

at least one optical system comprising an objective which forms an image of an object, said objective, depending on the respective direction of said light beam, defining a pre-objective scanning space and a postobjective scanning space;

a mounting structure for said at least one reflecting element;

drive means for moving said mounting structure in one of a linearly reciprocating motion and a continuously rotating motion; and an element for producing light, wherein, with light-producing, scanning takes place in said pre-objective space.

16. The device of claim 15, wherein said movement is a linearly reciprocating movement.

17. The device of claim 15, wherein said movement is a continuously rotating movement.

18. The device of claim 15, wherein said light-reflecting element is at least one right angle prism.

19. The device of claim 15, wherein said light-reflecting element is at least one pair of mirrors including between them an angle less than 180°.

20. The device of claim 17, wherein said light-reflecting element comprises a plurality of pairs of mirrors arranged in an annular configuration.

21. The device of claim 16, wherein said drive means is a moving-coil galvanometric drive.

22. The device of claim 21, wherein the coil of said moving-coil drive means is an integral part of a printed circuit board.

23. The device of claim 12, wherein said drive means is an electric motor causing said mounting structure to rotate.

24. The device of claim 16, wherein said movement is opposed by the restoring force of at least one elastically resilient member.

25. The device of claim 15, further comprising a position sensor.

26. The device of claim 25, wherein said position sensor includes a light source and a bi-cell photodetector stationary relative to a carrying member, wherein a differential output of the two cells of said bi-cell photodetector varies as a function of an instantaneous position of said reflecting element.

27. The device of claim 25, wherein said position sensor is a rotary encoder coupled to an electric motor.

* * * * *